(12) United States Patent
Helmsworth

(10) Patent No.: US 9,411,084 B2
(45) Date of Patent: Aug. 9, 2016

(54) METHOD AND SYSTEM OF ILLUMINATING POURED SURFACES

(71) Applicant: Thomas Frederick Helmsworth, Muscatine, IA (US)

(72) Inventor: Thomas Frederick Helmsworth, Muscatine, IA (US)

(*) Notice: Subject to any disclaimer, the term of this patent is extended or adjusted under 35 U.S.C. 154(b) by 105 days.

(21) Appl. No.: 14/481,159

(22) Filed: Sep. 9, 2014

(65) Prior Publication Data

US 2016/0070046 A1 Mar. 10, 2016

(51) Int. Cl.
| | | |
|---|---|---|
| *F21V 8/00* | (2006.01) | |
| *F21V 33/00* | (2006.01) | |
| *G02B 6/50* | (2006.01) | |
| *F21W 111/023* | (2006.01) | |

(52) U.S. Cl.
CPC .............. *G02B 6/0008* (2013.01); *F21V 33/006* (2013.01); *F21V 2200/13* (2015.01); *F21W 2111/023* (2013.01); *G02B 6/504* (2013.01)

(58) Field of Classification Search
CPC .... G02B 6/504; G02B 6/0008; F21V 33/006; F21V 2200/00; F21V 2200/13; F21S 8/022; F21S 8/081; F21S 8/083; F21K 9/90; G09F 19/228; G09F 9/305; G09F 2019/223; F21W 2111/02; F21W 2111/023; F21W 2111/027
USPC ....................................... 362/153.1
See application file for complete search history.

(56) References Cited

U.S. PATENT DOCUMENTS

| | | | | |
|---|---|---|---|---|
| 2002/0159275 A1* | 10/2002 | Nicholls | ................ | A63C 19/02 362/559 |
| 2004/0032748 A1* | 2/2004 | Trudeau | .............. | B28B 23/0037 362/554 |

* cited by examiner

*Primary Examiner* — Anh Mai
*Assistant Examiner* — Steven Horikoshi
(74) *Attorney, Agent, or Firm* — Dunlap Bennett & Ludwig PLLC

(57) ABSTRACT

A method of illuminating poured surfaces is provided. The method embeds fiber optic strands into poured surfaces during the formation thereof. Each fiber optic strand may be supported by a positioning apparatus prior to and during the pouring and setting of the poured surface, wherein no part of the positioning apparatus is visible above a top surface of the operable poured surface, yet the fiber optic strands are exposed near the top surface so as to form desired patterns of points of light.

5 Claims, 3 Drawing Sheets

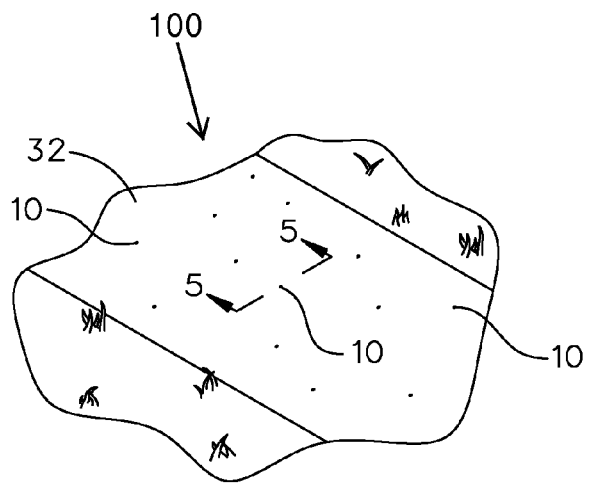
FIG.1
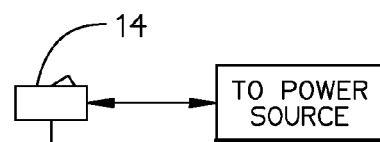
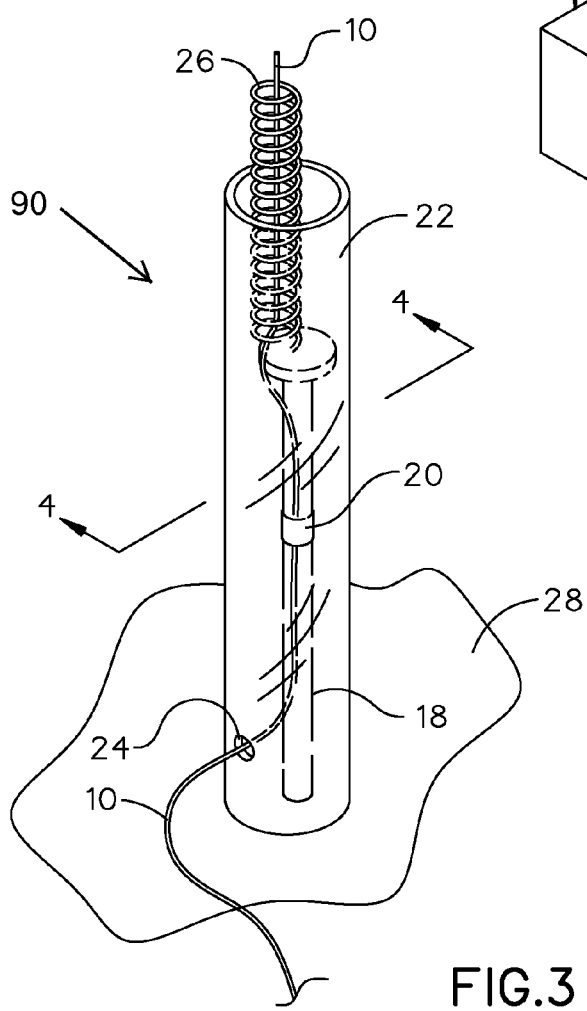
FIG.2
FIG.3

US 9,411,084 B2

METHOD AND SYSTEM OF ILLUMINATING POURED SURFACES

BACKGROUND OF THE INVENTION

The present invention relates to fiber optic illumination and, more particularly, a method of installing fiber optic illumination in poured surfaces.

Devices for providing lighting around a walkway often supply more light than needed and so washout or otherwise detract from the scenery around the walkway, frustrating the lighting's aesthetic purpose or even causing night blindness. Embedding fiber optics in the walkway itself can rectify this problem, but currently the only available walkway components are prefabricated with embedded fiber optics, which is prohibitively expensive and limits the surface area and shapes the walkway can form.

As can be seen, there is a need for a method of installing fiber optic illumination in poured surfaces.

SUMMARY OF THE INVENTION

In one aspect of the present invention, a method of embedding fiber optic strands in a poured surface, comprises the steps of: providing a light source being operative to radiate light; providing at least one fiber optic strand having an input end and an output end; optically communicating each input end to the light source; providing at least one positioning apparatus comprising: a driven portion; and a mounted portion configured to support the output end during the pouring of the poured surface; defining a pouring space by a predetermined height, a desired shape and a ground surface; in a desired pattern, driving the driven portion into the ground surface within the pouring space so that the mounted portion is near the predetermined height; joining the at least on fiber optic strand to the at least one positioning apparatus so that the output end protrudes above the mounted portion; pouring the poured surface to fill the pouring space to near the predetermined height; removing the mounting portion before the pouring surface has set and after leveling a top surface of the pouring surface; and trimming the at least one fiber optic strand so the output end is flush with the top surface.

In another aspect of the present invention, a illumination system comprises: a light source being operative to radiate light; at least one fiber optic strand having an input end and an output end, wherein each input end is in optical communication with the light source; a pouring space defined by a predetermined height, a shape and a ground surface; at least one positioning apparatus comprising: a driven portion, wherein the driven portion are connected to the ground surface within the pouring space; and a mounted portion mounted to the driven portion, wherein the mounted portion is configured to support the output end during the pouring of the poured surface, and wherein the mounted portion is slightly higher than the predetermined height; joining means securely joining the at least on fiber optic strand to the at least one positioning apparatus so that each output end protrudes above the mounted portion; and a poured surface filling the pouring space so as to embed a portion of the at least one fiber optic strand therein.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention;

FIG. 2 is a schematic view of an exemplary embodiment of a power source and a light source of the present invention;

FIG. 3 is a section view of an exemplary embodiment of a positioning apparatus of the present invention prior to pouring a poured surface;

DETAILED DESCRIPTION OF THE INVENTION

Figure 4:
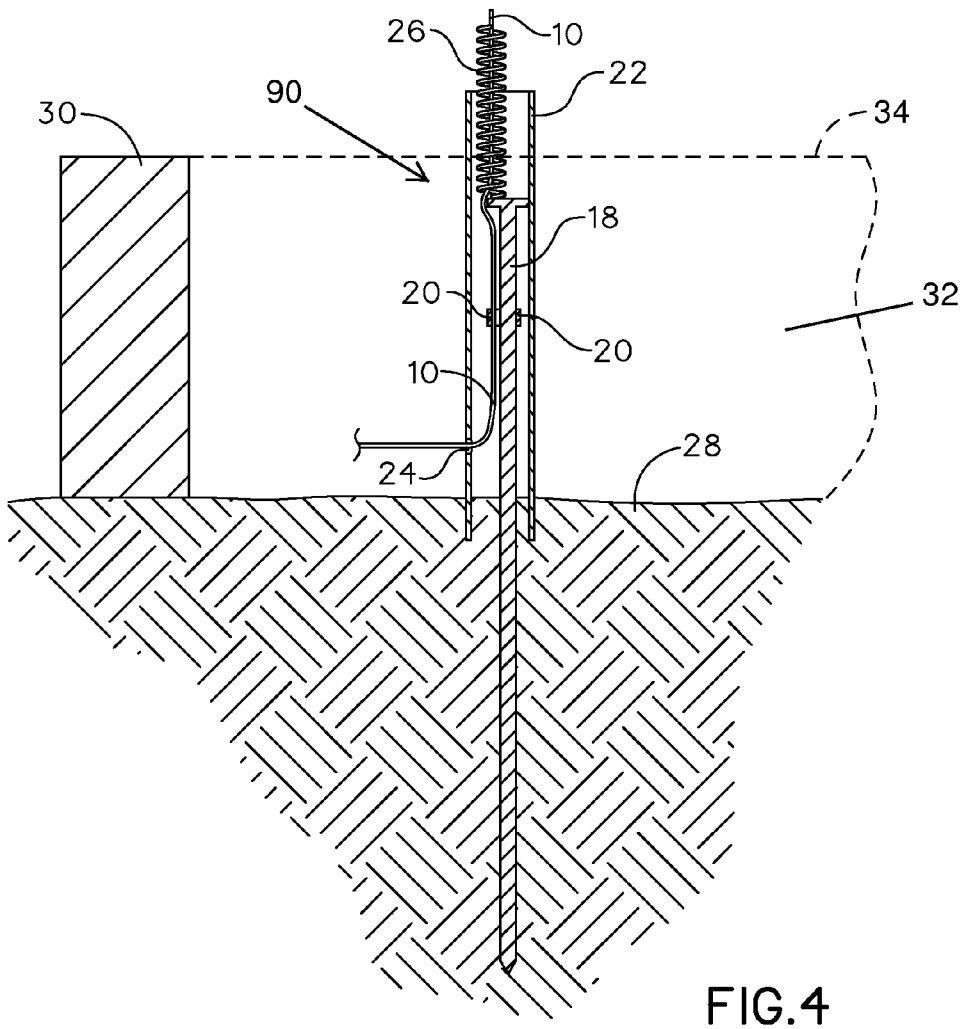
FIG. 4 is a section view of an exemplary embodiment of the present invention, taken along line 4-4 in FIG. 2.
Figure 5:
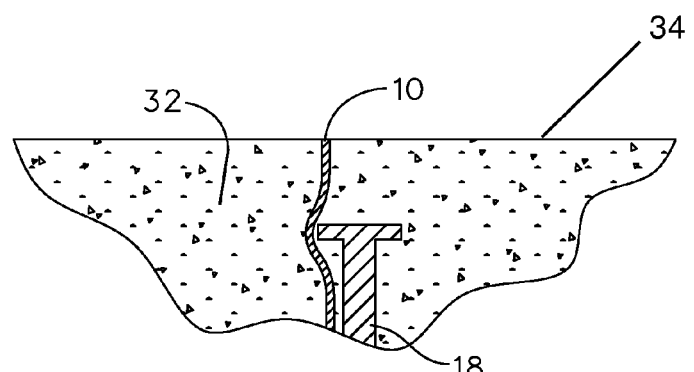
FIG. 5 is a detail section view of an exemplary embodiment of the present invention, taken along line 5-5 in FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of illuminating poured surfaces by embedding fiber optic strands into poured surfaces during the formation thereof. Each fiber optic strand may be supported by a positioning apparatus prior to and during the pouring and setting of the poured surface, wherein no part of the positioning apparatus is visible above a top surface of the operable poured surface, yet the fiber optic strands are exposed near the top surface so as to form desired patterns of points of light.

Referring to FIGS. 1 through 5, depict an illuminated surface 100 constructed in accordance with the present invention. It is contemplated that the present invention may be particularly useful when used in connection with poured concrete surfaces, but may be used for mood lighting in indoor hallways indoors or in RVs, as well as to light any concrete or poured plastic surface. As such, according to various embodiments, the illuminated surface 100 may include a light source 12, a power source 14, a plurality of fiber optic strands 10, a plurality of positioning apparatuses 90 and a poured surface 32.

The light source 12 may include a light emitting diode (LED) light engine or the like. Each fiber optic strand 10 has an input end and an output end opposite the input end, wherein each input end may be in optical communication with the light source 12. The plurality of fiber optic strands 10 or a portion thereof may be provided in at least one fiber optic bundle 16.

The poured surface 32 may be composed of concrete, asphalt, cement, grout, any composite material composed of water, coarse granular material embedded in a hard matrix of material, plastic, plasticized material or the like. The poured surface 32 may be constructed by installing at least one pouring form 30 of a predetermined height and shape about a ground surface 28 that defines a pouring space. The at least one pouring form 30 allows an individual to form the poured surface 32 into desired shape and heights that can be accommodated by the ground surface 28. The poured surface 32, after drying, setting and or curing, forms a top surface 34.

Each position apparatus 90 may include a guide post 18, a joining strap 20, a positioning sleeve 22 and a fiber spring 26.

Each guide post 18 may be a nail or the like with a lower portion and an upper portion opposite the lower portion. Each guide post 18 may be generally perpendicularly connected to the ground surface 28 by, for example, driving the lower portion into the ground surface 28 so that the upper portion terminates between the guide post 18 and the predetermined height of the pouring form 30.

Each positioning sleeve 22 may define a channel. Each positioning sleeve 22 may be generally perpendicularly connected to the ground surface 28 so that the channel receives the upper portion of the guide post 18, as illustrated in FIG. 4. Each positioning sleeve 22 may be configured to allow safe passage for the at least one fiber optic strand 10 from embedded within the poured surface 32 to the top surface 34. To this end, each positioning sleeve 22 may provide a sleeve aperture 24 sized so as to slidably receive at least one output end and a trailing portion of the at least one fiber optic strand 10.

Joining straps 20, such as for example, adhesive tape, are next employed for securing together the guide post 18 and the complementary trailing portion of the at least one fiber optic strand 10 so that its output end is disposed above the predetermined height of the pouring form 30. Such joining straps 20 are also for positioning the output ends into desired patterns of points of lights.

The fiber springs 26 may be removably mounted to an upper portion of the guide posts 18 so as to receive the at least one output end and the trailing portion of the at least one fiber optic strand 10. The fiber springs 26 may be a flexible member for keeping upright the output end and the trailing portion above the upper portion of the guide posts 18, especially during the pouring of the poured surface 32, yet flexible enough to allow for adaptability of the position of said output end during the post-leveling setting of the poured surface 32.

The fiber springs 26 may form a mounted portion of each position apparatus 90, opposite a driven portion of each position apparatus 90, wherein the driven portion comprises the lower portion of each guide post 18.

Figure 6:
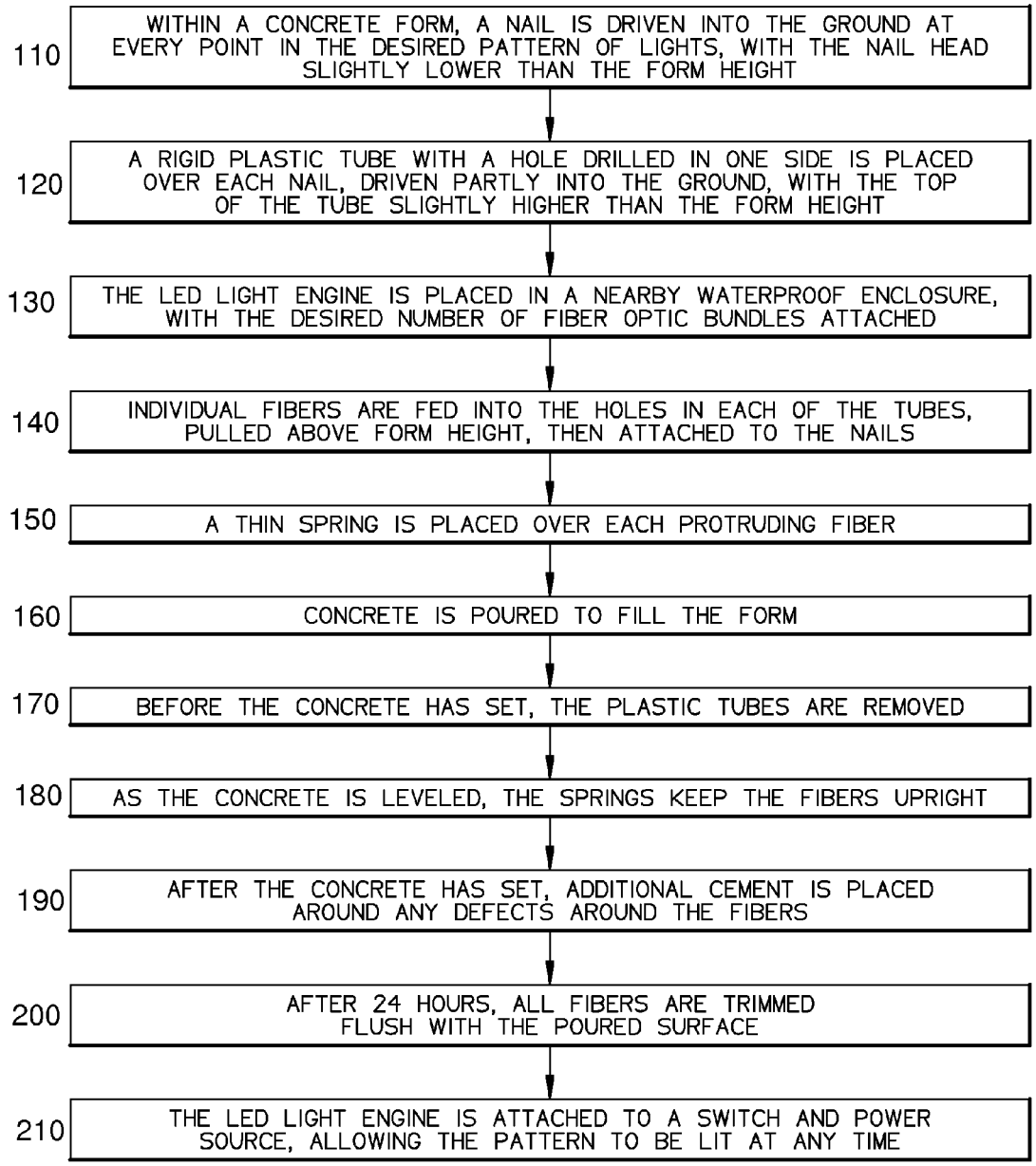
FIG. 6 is a flow chart of an exemplary embodiment of the present invention.

Referring to FIG. 6, the present invention may be furthermore accomplished by means of a method of installing fiber optic illumination in poured surfaces 32 as demonstrated in the following steps: First, prior to pouring the poured surface 32, within the pouring form 30 of a desired shape and predetermined height, the plurality of guide posts 18 are driven into the ground surface 28 near every point of a desired pattern of points of light, with the upper portion of each guide post 18 slightly lower than the predetermined height of the pouring form 30, in step 110. Subsequently, in step 120, the rigid positioning sleeve 22 having at least one sleeve aperture 24 is positioned over each guide post 18, thereby affording space for passage bores within the initially poured surface 32, and may be driven partly into the ground surface 28 with the upper portion of the positioning sleeve 22 slightly higher than the predetermined height of the pouring form 30.

The light source 12 can then be placed in a nearby waterproof enclosure, with the desired number of fiber optic bundles 16 optically communicated thereto, in step 130.

Individual fiber optic strands 10 are separated from the bundles 16 and positioned within the space circumscribed by the pouring form 30 so that a strand 10 can be fed into each sleeve aperture 24 and then secured to the guide posts 18 by the joining straps 20, in step 140.

Subsequently, a spring guide 26 is positioned over each protruding output end, in step 150.

Then the poured surface 32, e.g., the concrete or the like, is poured to fill the pouring form 30, in step 160.

Before the poured concrete 32 has set, the positioning sleeves 22 are removed, in step 170, so that the passage bores afforded by the sleeves 22 are filled in by the poured surface 32.

As the poured surface 32 is leveled, the fiber springs 26 keep the output ends of the strands 10 upright, in step 180. Then, after the poured surface 32 is leveled, the fiber springs 26 are removed.

After the concrete has set, additional cement is placed around any defects around the strands 10, in step 190.

After 24 hours, all trailing portions of the at least one fiber optic strand 10 is trimmed substantially flush with the top surface 34 so as to expose the output end at the top surface 34, in step 200.

The light source 12 is then electrically connected to the power source 14, allowing the pattern of points of light to be lit at any time, in step 210.

It should be understood, of course, that the foregoing relates to exemplary embodiments of the invention and that modifications may be made without departing from the spirit and scope of the invention as set forth in the following claims.

What is claimed is:

1. A method of embedding fiber optic strands in a poured surface, comprising:
providing a light source being operative to radiate light;
providing at least one fiber optic strand having an input end and an output end;
optically communicating each input end to the light source;
providing at least one positioning apparatus comprising:
 a driven portion; and
 a mounted portion configured to support the output end during the pouring of the poured surface;
defining a pouring space by a predetermined height, a desired shape and a ground surface;
in a desired pattern, driving the driven portion into the ground surface within the pouring space so that the mounted portion is near the predetermined height;
joining the at least on fiber optic strand to the at least one positioning apparatus so that the output end protrudes above the mounted portion;
pouring the poured surface to fill the pouring space to near the predetermined height;
removing the mounting portion before the pouring surface has set and after leveling a top surface of the pouring surface; and
trimming the at least one fiber optic strand so the output end is substantially flush with the top surface.

2. The method of claim 1, wherein the driven portion comprises a rigid positioning sleeve mounted on a guide post.

3. The method of claim 2, wherein the positioning sleeve defines a sleeve aperture sized so as to slidably receive a portion of the at least one fiber optic strand.

4. The method of claim 2, wherein the mounted portion comprises a flexible fiber spring mounted on the guide post.

5. The method of claim 1, further including providing a joining strap for joining the at least on fiber optic strand to the at least one positioning apparatus.

* * * * *